(12) United States Patent
Dighe et al.

(10) Patent No.: US 7,632,394 B2
(45) Date of Patent: Dec. 15, 2009

(54) SYSTEM AND PROCESS FOR UPGRADING HEAVY HYDROCARBONS

(75) Inventors: Shyam V. Dighe, North Huntingdon, PA (US); Mark Anthony Montemurro, Calgary (CA); Richard Dale Bower, Calgary (CA); Aleksandr Gorodetsky, Calgary (CA); Mark F. Darr, Acme, PA (US); Ivan A. Martorell, Delmont, PA (US)

(73) Assignee: Westinghouse Plasma Corporation, Madison, PA (US)

( * ) Notice: Subject to any disclaimer, the term of this patent is extended or adjusted under 35 U.S.C. 154(b) by 252 days.

(21) Appl. No.: 11/807,436

(22) Filed: May 29, 2007

(65) Prior Publication Data

US 2008/0299019 A1    Dec. 4, 2008

(51) Int. Cl.
C10G 51/02    (2006.01)

(52) U.S. Cl. .................. 208/75; 208/72; 208/126; 208/130

(58) Field of Classification Search .............. 208/434, 208/67, 72, 75, 77, 106, 126, 128, 130
See application file for complete search history.

(56) References Cited

U.S. PATENT DOCUMENTS

| | | | |
|---|---|---|---|
| 4,115,074 A | 9/1978 | Yoshida et al. | |
| 4,160,479 A | 7/1979 | Richardson et al. | |
| 4,466,807 A | 8/1984 | Santen et al. | |
| 4,591,428 A | 5/1986 | Pronk | |
| 4,724,272 A * | 2/1988 | Raniere et al. | 585/500 |
| 4,761,793 A | 8/1988 | Digne et al. | |
| 4,853,111 A * | 8/1989 | MacArthur et al. | 208/421 |
| 4,998,486 A | 3/1991 | Dighe et al. | |
| 5,626,726 A | 5/1997 | Kong | |
| 5,809,911 A | 9/1998 | Feizollahi | |
| 6,395,197 B1 | 5/2002 | Detering et al. | |
| 6,524,469 B1 | 2/2003 | Schucker | |
| 6,852,215 B2 | 2/2005 | Wen et al. | |
| 6,896,854 B2 | 5/2005 | Kong et al. | |

(Continued)

OTHER PUBLICATIONS

Dighe et al., "Westinghouse Plasma-Fired Process for Treatment of Industrial Wastes," Iron and Steel Engineer, Jan. 1992, pp. 44-48.

(Continued)

Primary Examiner—Walter D Griffin
Assistant Examiner—Renee Robinson
(74) Attorney, Agent, or Firm—Gordon H. Telfer

(57) ABSTRACT

A system and process for upgrading hydrocarbons such as heavy oils includes high temperature plasma reactor apparatus, in one or more vessels, into which the oils are introduced along with water, such as steam, to produce lighter hydrocarbon fractions, along with carbon monoxide and hydrogen, that flows to an additional stage where more hydrocarbons and water are introduced for further fractionating reactions facilitated by reaction of carbon monoxide and water to produce carbon dioxide and nascent, or prompt, free radicals of hydrogen. Heavy hydrocarbons upgraded can include heavy oils in the form of tar sands, oil shale, and oil residuals. The vessel or vessels can each contain a carbonaceous bed facilitating the described reactions and example embodiments include one vessel with the reactions performed in a single bed and, also, two vessels with the reactions performed in a carbonaceous bed portion in each vessel.

13 Claims, 4 Drawing Sheets

U.S. PATENT DOCUMENTS

| | | |
|---|---|---|
| 2003/0024806 A1 | 2/2003 | Foret |
| 2004/0104147 A1 | 6/2004 | Wen |
| 2004/0251241 A1 | 12/2004 | Blutke et al. |
| 2005/0204969 A1 | 9/2005 | Capote et al. |
| 2006/0065172 A1 | 3/2006 | Capote et al. |
| 2006/0112639 A1* | 6/2006 | Nick et al. ............ 48/198.1 |
| 2006/0231455 A1 | 10/2006 | Olsvik et al. |

OTHER PUBLICATIONS

Westinghouse Plasma Corporation, "Industrial Plasma Torch Systems," Descriptive Bulletin 27-501, published by approximately 2005, pp. 1-15.

* cited by examiner

SYSTEM AND PROCESS FOR UPGRADING HEAVY HYDROCARBONS

FIELD OF THE INVENTION

The invention relates generally to treatment of high molecular weight hydrocarbons to yield lower molecular weight hydrocarbons, such as upgrading heavy oils to light oils.

BACKGROUND

This background is presented merely to give a brief general orientation.

Petroleum refining (or "cracking" or "fractionating") is a long established and vast field of art encompassing a variety of techniques to treat oil initially recovered from the earth to produce lighter weight hydrocarbons generally more suitable for purposes such as heating oil and gasoline. A drive for innovative techniques in this field is heightened by, for example, expectations of less abundant future availability of more readily refined light, sweet crude petroleum compared to heavier petroleum from the ground and the increasing interest in techniques for facilitating production of readily useful oil from less conventional sources such as tar sands and oil shale.

Another body of materials treatment technology exists using a plasma fired cupola (sometimes referred to as a "plasma gasification reactor" or "PGR") in pyrolytic processes to derive more useful materials from what otherwise might be waste material. Just a few examples of the practical application of this general technology are briefly described, for example, by Shyam V. Dighe in an article entitled, "Westinghouse Plasma-Fired Processes for Treatment of Industrial Wastes" in *Iron and Steel Engineer*, January 1992, pp. 44-48, where the plasma cupola technology is discussed in connection with a wide range of materials including, for example, fragmented scrap metal, hazardous waste, shredded computer hardware, and landfill material. Some applications develop useful material, e.g., metals such as iron, and, or independently, vitrify undesirable waste for easier disposition. Additional thermal plasma system processes that have been previously used or proposed include gas reforming such as is described in *Industrial Plasma Torch Systems*, Westinghouse Plasma Corporation, Descriptive Bulletin 27-501, published in or by 2005. There it is mentioned that virtually any fuel source (gas, oil, coal or others) can be thermally reformed by the intense heat produced by plasma torches.

SUMMARY

The present invention is generally directed to systems and processes that draw on, modify, and adapt the known art relating to PGRs in innovative ways for treating hydrocarbons such as the heavy oils to produce lighter oils.

The following description includes example embodiments of such systems and processes.

DESCRIPTION

Figure 1:
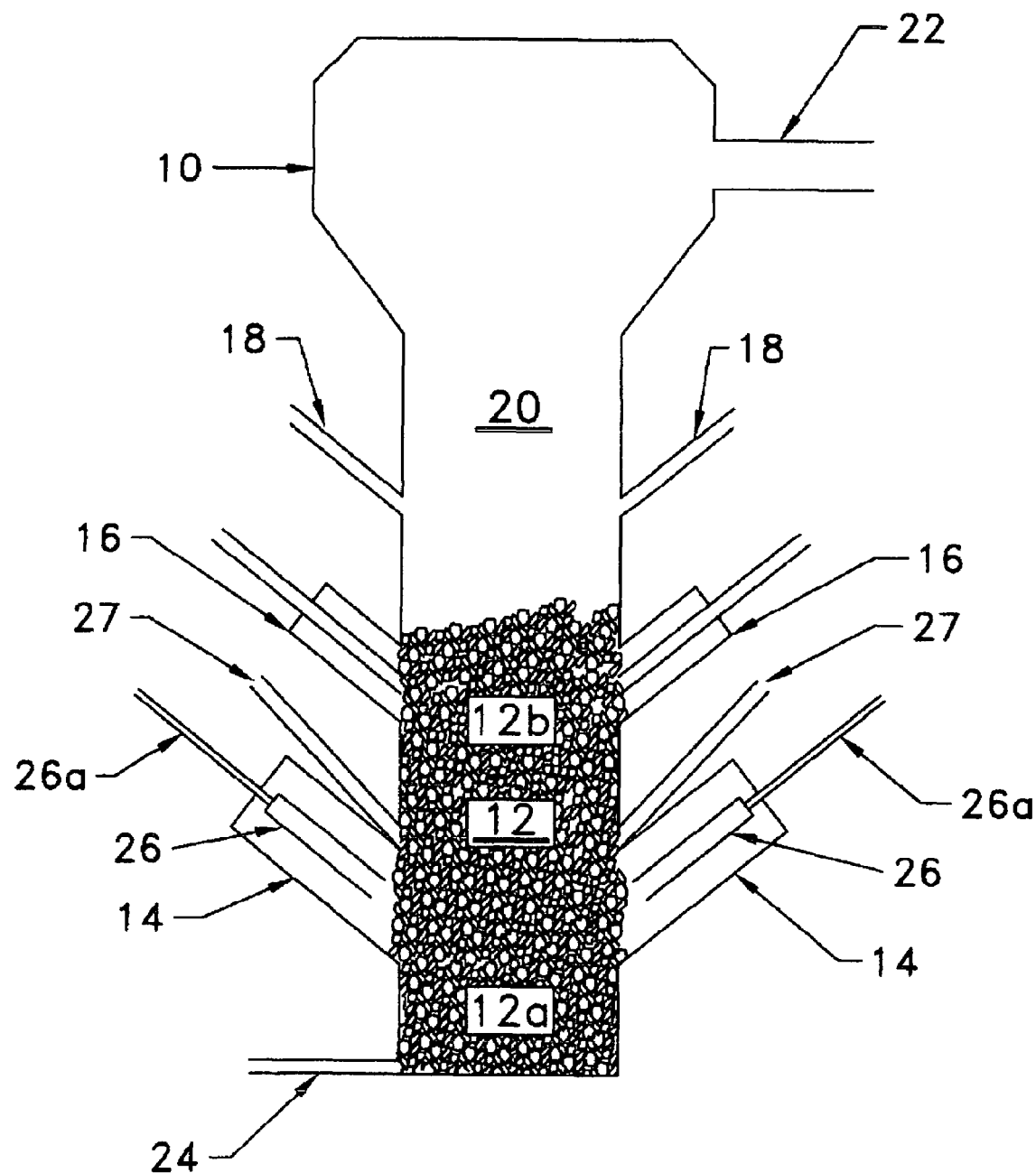
FIG. 1 is an elevation view partly in section, of a system including a plasma cupola.

FIG. 1 shows a plasma gasification reactor (PGR) (or plasma fired cupola) 10 that is a vessel, e.g., of metal lined with refractory material, containing, near the bottom, a carbonaceous bed 12 and various inlets or nozzles (sometimes referred to as tuyeres) for supply of plasma gas and other materials to the reactor vessel 10.

The carbonaceous bed 12 can be of known constituents (e.g., including fragmented coke (such as either foundry coke or petroleum coke) or mixed coke and coal). Just for example, the vessel 10 can be about 10-12 meters high and the section with the bed 12 can have an inner diameter of about 3-4 meters; the bed 12 itself having a depth of about 1-4 meters. By way of further example, the bed 12 can be of particles or fragments with an average diameter of about 5 cm. to 10 cm.; this provides an ample reactive surface area while allowing flow of supplied materials and products of reactions.

Figure 2:
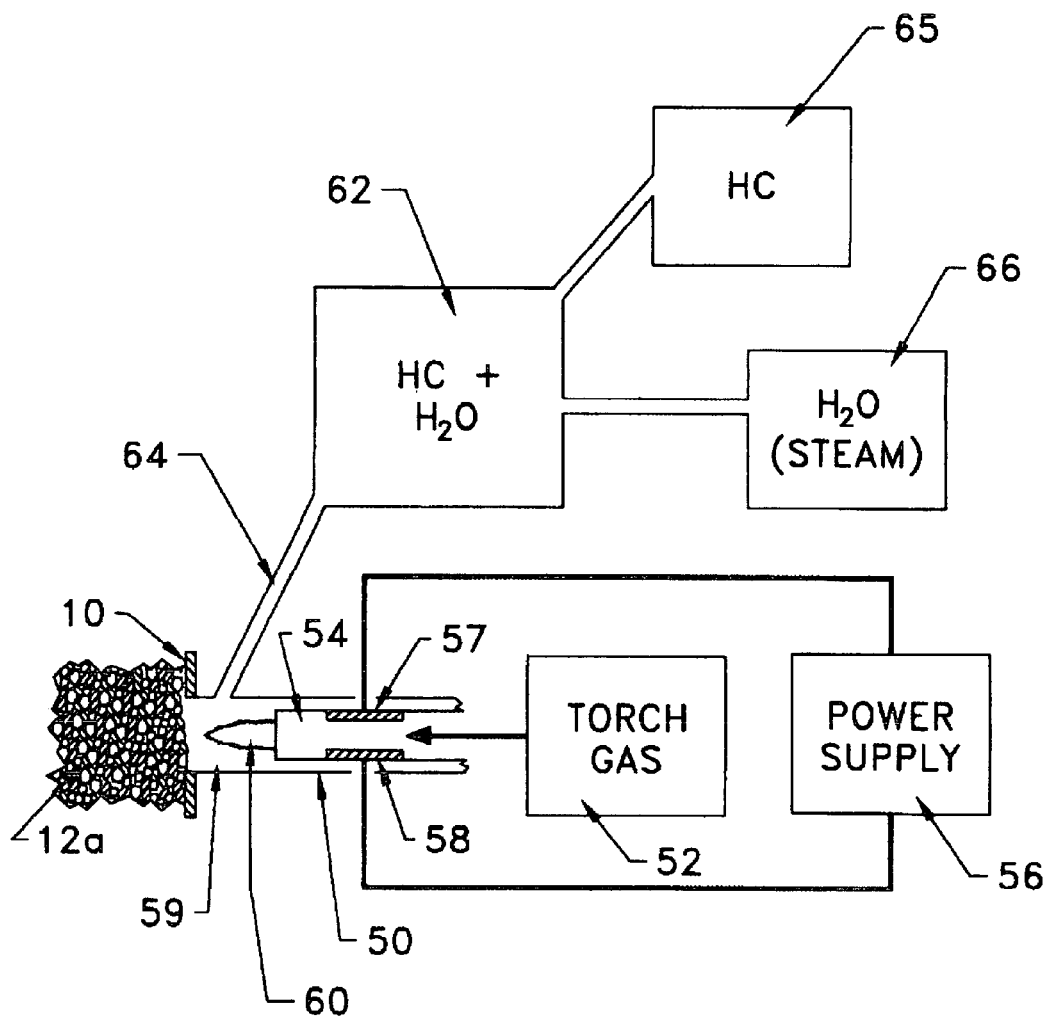
FIG. 2 is an elevation view, partly in section, of a nozzle including a plasma torch.

The basic PGR arrangement shown is one in which the plasma plume of (e.g., plume 60 of the torch 54 of FIG. 2 is not transferred to another electrode. It is also one in which the plasma torch is outside of, not submerged within, the principal reaction site (such as the bed 12).

In the disclosed examples, the carbonaceous bed 12 is substantially stationary and the reactor arrangement may be referred to as a stationary bed reactor or a "plug flow reactor" as such terms have been sometimes used in plasma reactor terminology.

The inlets or nozzles to the vessel 10 include:

one or more (here two) plasma torch nozzles 14 located at or near a lower portion 12*a* of the bed 12;

one or more (here two) material supply nozzles 16 at or near an upper portion 12*b* of the bed 12; and one or more (here two) inlets 18 to a space 20 in the vessel 10 that is above the bed 12 (sometimes referred to as the freeboard region).

In addition, the vessel 10 has outlets including a product and gas exit port 22 at or near the top of the vessel 10 and, also, (depending on the composition of the bed 12 and supplied material, e.g., including sulfur and various metals) an appropriately sized slag outlet 24 at or near the bottom of the vessel 10.

For this example, the torch nozzles 14 of FIG. 1 (a further example of which is shown in FIG. 2, discussed below) each have a plasma torch 26 with a conduit 26*a* or connection with a torch gas supply (not shown). In accordance with prior technology, the torch gas can be chosen from a large number of different gases. Examples for present purposes include the following as well as mixtures thereof: compressed air, carbon dioxide, hydrogen, methane, or any gaseous hydrocarbon including recycled or exhaust gas from an operating plant such as a refinery or gas-to-liquid plant that may be near the vessel 10.

The nozzles 14 also have inlets 27 for a supply of a working material containing heavy hydrocarbon material, such as heavy oil, and water (e.g. steam). The hydrocarbon and steam may be supplied separately or together to the nozzles 14. FIG. 1 illustrates in a general manner that the supplied materials through inlets 27 are introduced to locations near the ends of the torches 26 at which a plasma is emitted toward the interior of the vessel 10, either right in the nozzle 14 (e.g., as shown in FIG. 2) or at a location within the vessel 10 near to the nozzle 14.

As indicated above, it is of interest to introduce heavy oils as the working material (e.g., high molecular weight CH compounds, such as tarry petroleum, tar sand oil, oil shale, oil residuals, syncrude, bitumen, etc.) and the example description will be directed to use with heavy oils. More generally, other hydrocarbonaceous material can also be processed such as refinery wastes or other sources of material including such things as asphalt, paraffin or other similar hydrocarbons. (For present purposes all such materials can be included within "heavy oils".)

The heavy oils and other hydrocarbons of primary interest for treatment in the present system and process are those in which the ratio of H atoms to C atoms in the molecules of the material are (at least in significant part) in a range of from about 1 up to near to but less than 2 (most heavy oils and the like are in a range of H to C of approximately 1.1 to 1.7). After the treatment, as will be described, a quantity of lighter oil fractions with an H to C ratio in a range of about 2 to 2.5 results. ("Light, sweet, crude oil" is desirable oil in that range.) For example, conversion of some heavy oil with an H to C ratio of 1.54 to light oil having a ratio of about 2.2 has been performed. The desired products in the range of 2 to 2.5 may of course be mixed with other hydrocarbon molecules; conditions are to be maintained to help increase the yield of the desired range while minimizing others, such as higher ratio compounds that are gases at normal ambient temperatures. The heavy oils to be processed also typically have at least about 20 carbon atoms in each molecule.

The nature of the system and process is such that the introduced hydrocarbon is not required to have any particular degree of purity; mixtures with a substantial amount of dirt, sand, ore or other non-HC material are also processable. Additional additives into the nozzle 14 (through conduit 27 or otherwise) can include fluxing agents as desired in accordance with past PGR practice for facilitating suitable slag production to outlet 24.

Nozzles 14 and the HC (heavy oil) and $H_2O$ (steam) supplied with the plasma of the torches 26 set up conditions in the lower portion of the carbonaceous bed 12 for high temperature reaction (at least about 3000° F., e.g., 3000° F. to 8000° F., i.e., at least about 1600° C.) of the heavy oil to form lighter oil fractions. Along with the lighter oil fractions there is also produced some excess elemental carbon (C) from the heavy oils that is quite fine in particle size (e.g., on the order of a few nanometers) and, because of the size of the carbon and the high temperature of the bed portion 12a onto the surfaces of which the excess C deposits, the carbon so produced is promptly reactive with the steam $H_2O$ to produce more carbon monoxide and hydrogen gases (in addition to quantities of such gases produced in the initial reaction of the heavy oil and steam with the plasma fired bed).

Consequently, in the lower portion 12a of the carbonaceous bed 12, with the plasma and the other materials supplied by the nozzles 14, chemical reactions take place including at least a reaction of the introduced heavy oil with steam to produce lighter oil fractions and also some excess carbon plus some carbon monoxide (CO) and hydrogen ($H_2$) gases, and another reaction in which the excess carbon reacts with other steam molecules to produce additional CO and $H_2$ gases.

The lighter oil molecules and the CO and $H_2$ gases rise up through the bed 12 into an upper portion 12b of the bed where the additional nozzles 16 inject additional HC, such as more heavy oil, and steam ($H_2O$).

In this example, no plasma torches are required in the upper nozzles 16. Because of the heat generated by the plasma torches 26 in the lower bed portion 12a and the rising heat and reaction products from the lower portion 12a to the upper portion 12b, the temperature of the upper portion is also high, although it may be somewhat lower than the temperature of the lower portion. The additional supplied HC and steam to the upper bed portion 12b can react with each other to produce additional lighter oil fractions. Conditions in the upper bed portion 12b, e.g., the amount of steam and its injected location are set to favor reaction of the CO produced in the lower portion 12a with steam to convert (at least a substantial amount of) the CO to $CO_2$ along with production of hydrogen in what is referred to as a CO shift reaction. (An alternative arrangement may include plasma torches also in the upper nozzles to further influence the rate of reactions.)

A significant amount of hydrogen initially produced by the CO shift reaction is available as hydrogen free radicals (before and instead of all immediately forming $H_2$ gas that rises out from the bed 12). The hydrogen free radicals can also be characterized as nascent and prompt to react with heavy oil injected in this zone 12b (as well as some lighter oil fractions from the lower portion 12a) to produce greater quantities of oil fractions lighter than the introduced heavy oil and, to some extent, lighter than some oil fractions produced in portion 12a. This means the H to C atomic ratio is increased. Thus, the system performs a type of a process sometimes referred to as hydrotreating.

Oil fractions from the upper bed portion 12b rise into the region 20, called the freeboard region, above the bed 12. The inlets 18 to region 20 are for supplying, as needed or desired, a moderating gas to lower the temperature of the rising reaction products from the bed 12. This is performed primarily to prevent, or at least minimize, either, or both, further cracking of oil fractions and further gasification (e.g., the production of $CO_2$ and $H_2$). A moderating gas may, for example, be relatively low temperature steam, $CO_2$, or any gaseous hydrocarbon (including plant recycle gas) sufficient to reduce the temperature of the freeboard region 20 to about 450° C. or less. (While some further HC cracking in the freeboard region is acceptable, the moderating gas helps by increasing the yield of desirable lighter hydrocarbons rather than having more of the hydrocarbons pyrolyzed to pure gases or soot).

There may also be supplied into the reactor 10, such as into the region 20 above the bed 12, carbonaceous material to add to the bed. The carbon content of the bed 12 is normally not expected to change significantly but may vary enough over time to make additions desirable.

The lighter oils and other gaseous reaction products (e.g., $CO_2$ and $H_2$) in the region 20 rise and exit the top of the PGR 10 through the exit port 22. They are then available for use or further processing, including whatever separation, treatment for environmental protection, and exhaustion to the atmosphere is selected. The reactor 10 and the processes performed as described are capable of producing highly desirable amounts of light oil fractions and, also, hydrogen.

Referring to FIG. 2, there is shown an example of a nozzle 50 that may be used as a nozzle 14 in the apparatus of FIG. 1. Nozzle 50 can use technology as shown and described in U.S. Pat. No. 4,761,793 by Dighe et al. that is hereby incorporated by reference for its description relating to plasma feed nozzles. Nozzle 50 is shown as having or in combination with:

A supply of torch gas 52;

A plasma torch 54;

An electrical supply 56 to electrode elements 57 and 58 that develop an electric arc forming plasma in the torch 54 from the torch gas;

A plasma mixing chamber 59 in front of the plasma torch 54 into which a plume of plasma 60 from the torch 54 is injected;

A supply 62 of material for processing supplied through a conduit 64 (corresponding to conduit 27 of FIG. 1), where supply 62 includes heavy hydrocarbon material (e.g., heavy oil) and water (e.g., steam), each having a respective supply 65 and 66 before mixing in the supply 62; and The conduit 64 introduces the oil and steam directly into the plasma plume 60 in the chamber 69 with considerable intermixing of the process materials with the plasma before injection in to the reactor vessel 10.

In alternative examples, each of the heavy oil and steam supplies 65 and 66, respectively, can have a separate conduit to the mixing chamber 59 or, where a combined supply 62 is used, there may be additional steam introduced directly into the chamber 59.

As taught by examples in the above mentioned patent: chamber 59 can be lined with refractory material (not shown); the plasma plume 60 is primarily in a central portion of the chamber 69; and an additional supply to the nozzle 50 of a shroud gas (not shown) is provided in such a way as to swirl as it moves through the mixing chamber from a region near the torch 54 to a region of the chamber 59 near the opening into the vessel 10.

The heavy oil supplied to the reactor 10, such as from the supply 65, may be, as an option, preheated as desired, such as to enhance its fluidity.

By way of further example, the supply conduit 64 introduces materials into a central portion of the plasma plume and the shroud gas is introduced to swirl around, and at least partially enclose, the central portion of the plume into which the materials are introduced. For the shroud gas, any of a wide variety of gases may be used including those mentioned as examples for the torch gas in FIG. 1 as well as additional steam or a mixture of any such fluids.

Use of a shroud gas contributes to maintaining a temperature profile in the nozzle 50 that allows the nozzle structure around the plasma to remain cooler and have longer life.

One example of a plasma torch 54 for use in the nozzle 50 is that commercially available as the Mark 11 plasma torch of Westinghouse Plasma Corporation.

Figure 3:
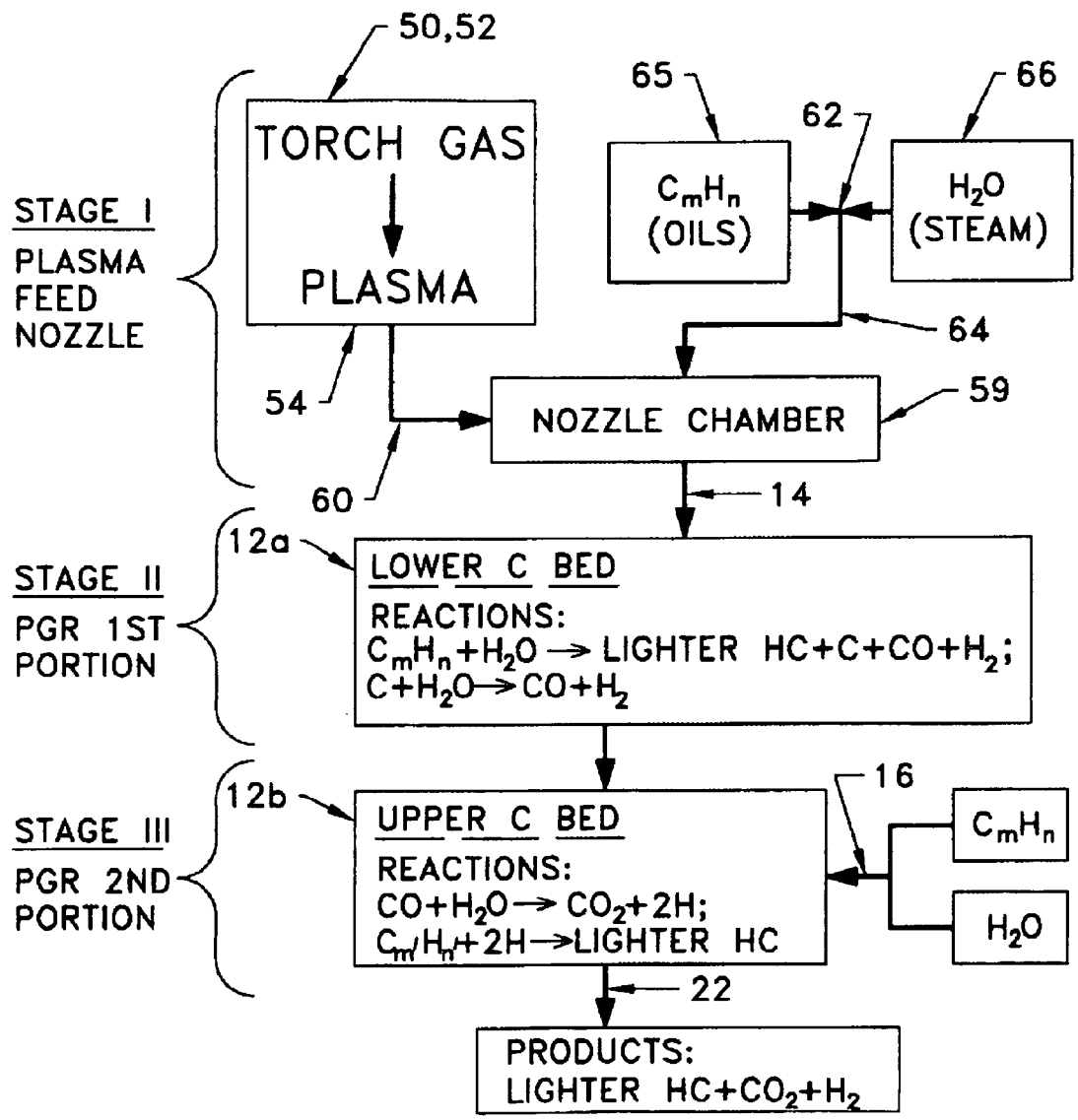
FIG. 3 is a block diagram flow chart of a process.

Referring to FIG. 3, there is shown a block diagram type of flow chart for steps included in some example processes. This illustrates in Stage I steps performed in or to a plasma feed nozzle, such as the nozzle 50 of FIG. 2, (reference numerals refer to corresponding or related elements of FIGS. 1 and 2) including supplying of a torch gas (52) and generating a plasma (60) by a plasma torch (54), supplying (65) a hydrocarbon $C_mH_n$ e.g., a heavy oil, and supplying $H_2O$ (66), e.g., as steam (here shown combined at point 62) and mixing of plasma (60) and the combined hydrocarbon and steam (64) in the nozzle mixing chamber (59).

There may of course be some reaction of the mixed materials in the nozzle chamber 59 that is not illustrated here.

The constituents of the mixture of the nozzle chamber (59) (as well as whatever reaction products are formed there) are shown in Stage II of FIG. 3 as applied in a step injecting them from the nozzle chamber 59 of a nozzle 14 or 50 into a first portion (lower portion 12a) of a carbonaceous bed in a PGR and also, reacting the constituents in the bed to form lighter hydrocarbon material as well as carbon (C), carbon monoxide (CO), and hydrogen ($H_2$).

These reactions of Stage II can be expressed in chemical nomenclature as:

$$C_mH_n + H_2O \rightarrow C_{m1}H_{n1} + C_{n2}H_{n2} + C_{m3}H_{n3} + \ldots$$
$$C_{mx}H_{nx} + C + CO + H_2$$

where m>m1, m2, m3, ... mx and n>n1, n2, n3, ... nx; and, in a second reaction in Stage II, $$C + H_2O \rightarrow CO + H_2.$$

(Some carbon in the reactions may be from the bed 12a as well as from the supplied hydrocarbons.) The following steps are then performed, shown as Stage III, to or in a second portion (upper portion 12b) of a carbonaceous bed in a PGR. The steps include allowing reaction products from the first portion to flow to the upper bed portion, supplying additional hydrocarbon material (nozzles 16) (e.g., heavy oil) and $H_2O$ (e.g., steam) to the second bed portion 12b and reacting the CO and $H_2O$ to form $CO_2$ and hydrogen in the form of elemental H free radicals that are promptly reactive with the added HC and the fractions flowing from the first portion constituents forming lighter HC compounds (e.g., upgrading HC supplied to portion 12b and also those flowing from the bed first portion to become still lighter).

These reactions of Stage III can be expressed in chemical nomenclature as:

$$CO + H_2O \rightarrow CO_2 + 2H$$

and $$C_{m'}H_{n'} + 2H \rightarrow C_{m1'}H_{n1'} + C_{m2'}H_{n2'} + C_{m3'}H_{n3'} + \ldots$$
$$C_{mx'}H_{nx'}$$

where m'>m1', m2', m3', mx' and n'>n1', n2', n3', nx'.

($C_{m'}H_{n'}$ comprises both additional $C_mH_n$ supplied to the upper bed portion 12b as well as fractions of CH from the lower bed portion 12a.)

After subjecting the foregoing reaction products to a moderating gas, if desired as discussed in connection with FIG. 1, a step is performed of allowing the products (light HC, $CO_2$ and $H_2$) to exit the PGR apparatus (outlet 22) for use or further processing.

The description is in no way intended to limit the location in the system at which the various reactions occur. Rather, it is the case that conditions are established to facilitate occurrence of the described reactions at the indicated locations. In most embodiments, it can be said the Stage II reactions predominantly occur in the PGR first portion 12a and the Stage III reactions predominantly occur in the PGR second portion 12b.

Figure 4:
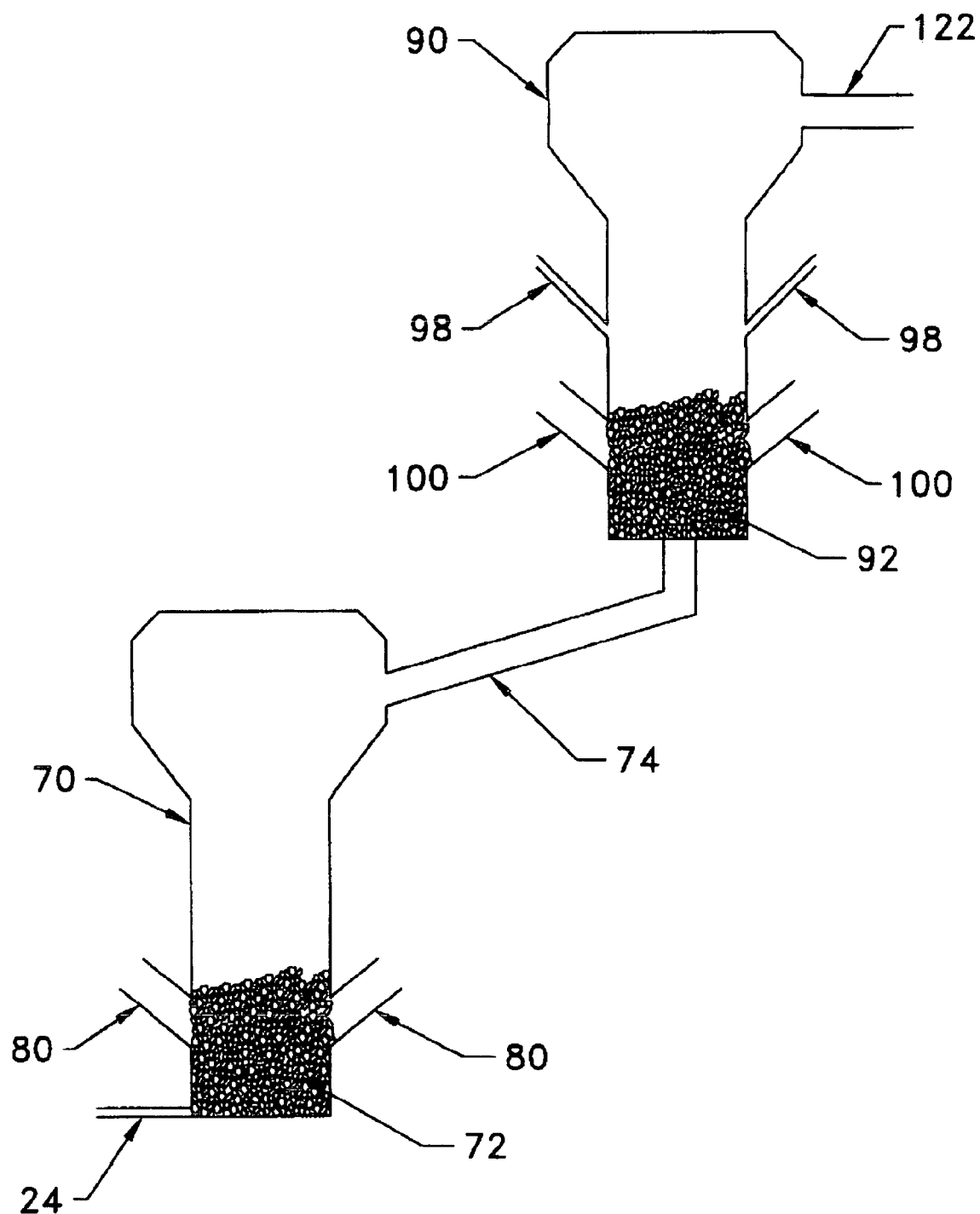
FIG. 4 is an elevation view of a system including two reactor vessels.

FIG. 4 illustrates another embodiment of a system. Here there are two reactor vessels 70 and 90 each with a respective carbonaceous bed portion 72 and 92 that substantially correspond to the respective bed portions 12a and 12b of the single vessel 10 shown in FIG. 1. All of the foregoing description applies subject to the following clarifications with a further aspect that the conditions in the two reactor vessels 70 and 90, e.g., gas pressures, can be different to further facilitate performing the predominant reactions in the respective first and second bed portions 72 and 92. A reactor 10 of FIG. 1 may, if desired, have a controlled pressure although it is suitable to operate at atmospheric pressure. The two reactors 70 and 90 of FIG. 4 allow either controlled pressures in each reactor, which may be different, or one or both of the reactors to operate at atmospheric pressure. The first reactor 70 is typically at the higher pressure than the second reactor 90 to facilitate flow from the reactor 70 to reactor 90.

The pressure within the reactors is determined by conditions such as the flow rates of material supplied to the reactor and the resulting temperature of the carbonaceous bed. Also, any back pressure from subsequent system elements influences the pressure. By way of further example, a single reactor 10 of FIG. 1 can be maintained at a pressure in the range of from about 50 Kpa to about 21,000 Kpa. And, in the embodiment of FIG. 4 a further example of the pressures is for the first reactor 70 to be maintained at a pressure in the range of from about 50 Kpa to about 21,000 Kpa and the second reactor 80 to be in the range of from 50 to 95% of the pressure of the first reactor 70. (The range of 50 to 21,000 Kpa, for Kilo pascals absolute, is approximately the same as ½ atmosphere to 200 atmospheres.)

Referring back to FIG. 4, one vessel 70 is equipped with one or more plasma feed nozzles 80 adjacent the bed portion 72 and the nozzles 80 correspond to, and have the same inputs as, nozzles 14 of FIG. 1 or, for example, nozzle 50, as in FIG. 2. Heavy oils and steam are introduced to the bed portion 72 as to bed portion 12*a* of FIG. 1 and as in Stage I of FIG. 3. Reactor 70 is equipped for processes referred to in Stage II of FIG. 3.

The second vessel 90 is equipped with nozzles 100 for supply of additional HC and $H_2O$ and correspond to the nozzles 16 of FIG. 1. Optionally, the nozzles 100 may also include plasma torches if desired to further affect the reaction rate. The second vessel 90 is arranged for the processes of Stage III of FIG. 3. In this example, as shown, the vessel 70 has a slag removal outlet 24 and the second vessel 90 has inlets 98 corresponding to inlets 18 of FIG. 1 for introduction of a moderating gas. The materials produced in the first vessel 70 flow through a conduit 74 to the second vessel 90 for treatment as described in the upper bed portion 12*b* of FIG. 1. The second vessel nozzles 100 are in the lower part of the vessel 90 adjacent the bed portion 92. Vessel 90 has an exit port 122 for the reaction products. (The second vessel 90 may also have a slag outlet.)

If desired, the second vessel inlet from the conduit 74 can be elevated in relation to the outlet of the first vessel (as shown) to facilitate flow of the transferred products. It is also suitable to adjust flow between the two vessels mechanically as well as make thermal adjustments to the fluids. The basic system does not require such modifications but they are among those that may be implemented.

The described systems of FIGS. 1 and 4 are not intended to rule out other system combinations with even more than two serially connected vessels in which are performed additional process operations like those of the second vessel 90 or other materials treatment processes or exclude systems in which additional processes are performed in the vessels shown in FIG. 1 or 4 (repetitive processes of the same type or additional distinct processes).

The various systems and processes described are examples of the intended innovations as to which other variations within the skill of the materials processing art can be performed if desired. Among other things, the present innovations provide upgrading of heavy petroleum products without necessitating expensive catalysts and high pressure reactors as used in some past systems for purposes of upgrading and hydrotreating.

The scope of the invention is exemplified by, but is not to be limited by, the embodiments disclosed.

What is claimed is:

1. A process for upgrading heavy petroleum materials to produce relatively lighter oils comprising the steps of:
   providing a carbonaceous bed having first and second portions;
   introducing into the first portion of the bed a combination of a plasma gas, a heavy-oil containing material, and steam with the combination sufficiently hot to raise the temperature of the bed to promote thermal dissociation of heavy oil to produce lighter oil fractions and to produce carbon particles reacting with steam to form carbon monoxide and hydrogen;
   allowing the reaction products from the bed first portion to flow to the second bed portion into which is introduced additional heavy-oil containing material and additional steam to promote further reactions including reacting carbon monoxide from the first portion of the bed with steam to produce carbon dioxide and hydrogen and reacting that hydrogen with either or both heavy oil from the additional heavy-oil containing material and the lighter oil fractions from the bed first portion to produce further lighter oil fractions; and
   withdrawing the lighter oil fractions along with residual carbon dioxide and hydrogen from the vessel.

2. The process of claim 1 including:
   arranging the first portion of the bed and its supplied plasma carried material to promote a first reaction of $C_mH_n + H_2O \rightarrow C_{m1}H_{n1} + H_{n2} + C_{m3}H_{n3} + \ldots C_{mx}H_{mx} + C + CO + H_2$ where m is larger than successively smaller m1, m2, m3 or mx and n is larger than successively smaller n1, n2, m3 or nx, and a second reaction of $C + H_2O \rightarrow CO + H_2$; and
   arranging the second portion of the bed and its supplied material to promote a third reaction of $CO + H_2O \rightarrow [CO_2 + H_2]CO_2 + 2H$ and a fourth reaction of $C_{m'}H_{n'} + 2H \rightarrow C_{m1'Hn1'} + C_{m2'Hn2'} + C_{m3'}H_{n3} \ldots C_{mx'}H_{nx'}$ where m' is larger than successively smaller m1', m2' or mx' and n' is larger than successively smaller n1', n2' or nx'.

3. The process of claim 1 further comprising:
   injecting a moderating gas into a space above the second portion of the bed to minimize further reactions.

4. The process of claim 2 where:
   the carbon particles produced in the first reaction have a size of on the order of nanometers or less and the 2H products of the third reaction are nascent, prompt, reactors with the $C_{m'}H_{n'}$ in the fourth reaction.

5. The process of claim 4 where:
   the introducing of heavy-oil containing material into either the first or second bed portion includes introducing any one or more of oil tar sand, oil shale, and oil residuals with $C_mH_n$ content where the ratio of n to m is in a range of about 1 up to less than 2.

6. A process for upgrading heavy hydrocarbon compounds to produce relatively lighter hydrocarbon compounds comprising the steps of:
   arranging a plasma reactor vessel with a carbonaceous bed near the bottom of the reactor vessel;
   providing working material, for reactions within the plasma reactor vessel, including heavy oil with CH molecules having at least about 20 C atoms and a ratio of H atoms to C atoms in a range of from about 1 up to less than 2, the working material also including a quantity of $H_2O$;
   supplying the working material through one or more inlets to a location in a plasma torch nozzle of the plasma reactor vessel or into the plasma reactor vessel near to the plasma torch nozzle so a combination of plasma and working material enters into a lower portion of the carbonaceous bed;
   establishing conditions, including an elevated temperature, in the lower portion of the carbonaceous bed for forming lighter oil fractions, plus CO and $H_2$ gases, from the working material along with forming excess elemental carbon that reacts with the $H_2O$ in the working material to produce additional CO and $H_2$ gases;
   allowing the lighter oil fractions and the CO and $H_2$ gases to flow from the lower portion of the carbonaceous bed into an upper portion of the carbonaceous bed in the same reactor vessel that is subject to heat rising from the lower portion of the carbonaceous bed;

supplying an additional quantity of working material to the upper portion of the carbonaceous bed;

establishing conditions in the upper portion of the carbonaceous bed for producing additional lighter oil fractions and also to produce some hydrogen which promptly reacts with CH compounds of the additional working material and the lighter oil fractions from the lower portion of the carbonaceous bed to produce additional lighter oil fractions; and, allowing the lighter oil fractions from the upper portion of the carbonaceous bed, along with gaseous reaction products, to exit from near the top of the reactor vessel.

7. The process of claim 6 where:

the providing of the working material is, at least in part, performed by forming a mixture containing the heavy oil and $H_2O$ in the form of steam before the supplying of the working material into the lower portion of the carbonaceous bed;

the supplying of the working material is into a plasma plume in the plasma torch nozzle;

the establishing of the conditions in the lower portion of the carbonaceous bed includes establishing a temperature of at least about 1600° C.; and, the supplying of an additional quantity of the working material to the upper portion of the carbonaceous bed includes supplying a mixture of the heavy oil and $H_2O$ in the form of steam.

8. The process of claim 6 where:

the establishing of conditions in the upper portion of the carbonaceous bed includes producing a temperature in the upper portion that results from heat rising from the lower portion of the carbonaceous bed without introduction of plasma into the upper portion;

the producing of lighter oil fractions in the upper portion of the carbonaceous bed includes producing oil fractions with an H to C ratio in a range of 2 to 2.5; and, further comprising, injecting a moderating gas into a freeboard region within the plasma reactor vessel above the upper portion of the carbonaceous bed to lower the temperature of the freeboard region to about 450° C. or less and to minimize further cracking of oil fractions and further gasification.

9. The process of claim 7 where:

the establishing of conditions in the upper portion of the carbonaceous bed includes producing a temperature in the upper portion that results from heat rising from the lower portion of the carbonaceous bed without introduction of plasma into the upper portion;

the producing of lighter oil fractions in the upper portion of the carbonaceous bed includes producing oil fractions with an H to C ratio in a range of 2 to 2.5; and, further comprising, injecting a moderating gas into a freeboard region within the plasma reactor vessel above the upper portion of the carbonaceous bed to lower the temperature of the freeboard region to about 450° C. or less and to minimize further cracking of oil fractions and further gasification.

10. A process for upgrading heavy hydrocarbon compounds to produce relatively lighter hydrocarbon compounds comprising the steps of:

arranging first and second reactor vessels each with a carbonaceous bed near the bottom of the reactor vessel and with a conduit for flow of materials from near the top of the first reactor vessel to near the bottom of the second reactor vessel, and at least the first reactor vessel being a plasma reactor vessel;

providing working material, for reactions within the reactor vessels, including heavy oil with CH molecules having at least about 20 C atoms and a ratio of H atoms to C atoms in a range of from about 1 up to less than 2, the working material also including a quantity of $H_2O$;

supplying some of the working material to the first reactor vessel through one or more inlets to a location in a plasma torch nozzle of the first reactor vessel or into the first reactor vessel near to the plasma torch nozzle so a combination of plasma and working material enters into the carbonaceous bed arranged in the first reactor vessel;

establishing conditions, including an elevated temperature, in the carbonaceous bed portion of the first reactor vessel for forming lighter oil fractions, plus CO and $H_2$ gases, from the working material along with forming excess elemental carbon that reacts with the $H_2O$ in the working material to produce additional CO and $H_2$ gases;

allowing the lighter oil fractions and the CO and $H_2$ gases to flow from the first reactor vessel through the conduit to the carbonaceous bed of the second reactor vessel;

supplying an additional quantity of working material to the carbonaceous bed of the second reactor vessel;

establishing conditions in the carbonaceous bed of the second reactor vessel for producing additional lighter oil fractions and also to produce some hydrogen which promptly reacts with CH compounds of the additional working material and the lighter oil fractions from the first reactor vessel to produce additional lighter oil fractions; and, allowing the lighter oil fractions from the carbonaceous bed portion of the second reactor vessel, along with gaseous reaction products, to exit from near the top of the second reactor vessel.

11. The process of claim 10 where:

the providing of the working material is, at least in part, performed by forming a mixture of the heavy oil and $H_2O$ in the form of steam before the supplying of the working material into the carbonaceous bed arranged in the first reactor vessel;

the supplying of some of the working material to the first reactor vessel is into a plasma plume in the plasma torch nozzle of the first reactor vessel;

the establishing of the conditions in the carbonaceous bed of the first reactor vessel includes establishing a temperature of at least about 1600° C.; and, the supplying of an additional quantity of the working material to the carbonaceous bed of the second reactor vessel includes supplying a mixture of the heavy oil and $H_2O$ in the form of steam.

12. The process of claim 10 where:

the establishing of conditions in the carbonaceous bed of the second reactor vessel includes producing a temperature in said bed that results from heat flowing from the carbonaceous bed of the first reactor vessel without introduction of plasma into the second reactor vessel;

the producing of lighter oil fractions in the carbonaceous bed of the second reactor vessel includes producing oil fractions with an H to C ratio in a range of 2 to 2.5; and, further comprising, injecting a moderating gas into a freeboard region within the second reactor vessel above the carbonaceous bed of the second reactor vessel to lower the temperature of the freeboard region to about 450° C. or less and to minimize further cracking of oil fractions and further gasification.

13. The process of claim 11 where:

the establishing of conditions in the carbonaceous bed of the second reactor vessel includes producing a temperature in said bed that results from heat flowing from the carbonaceous bed of the first reactor vessel without introduction of plasma into the second reactor vessel;

the producing of lighter oil fractions in the carbonaceous bed of the second reactor vessel includes producing oil fractions with an H to C ratio in a range of 2 to 2.5; and, further comprising, injecting a moderating gas into a freeboard region within the second reactor vessel above the carbonaceous bed of the second reactor vessel to lower the temperature of the freeboard region to about 450° C. or less and to minimize further cracking of oil fractions and further gasification.

* * * * *